J. Morton,
Water Tank.
No 63,418. Patented Apr. 2, 1867.
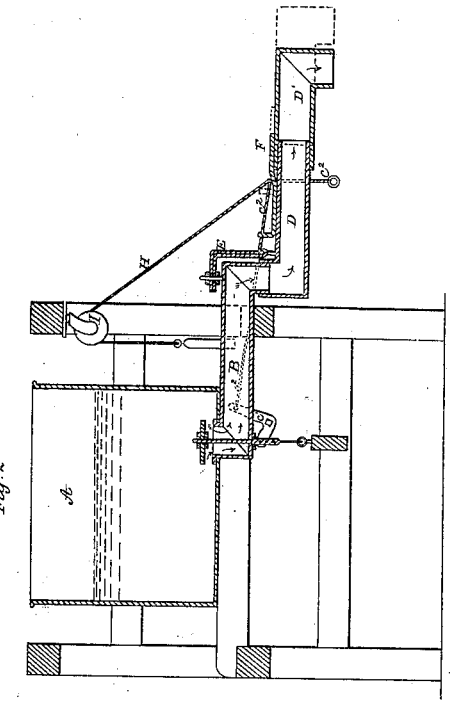
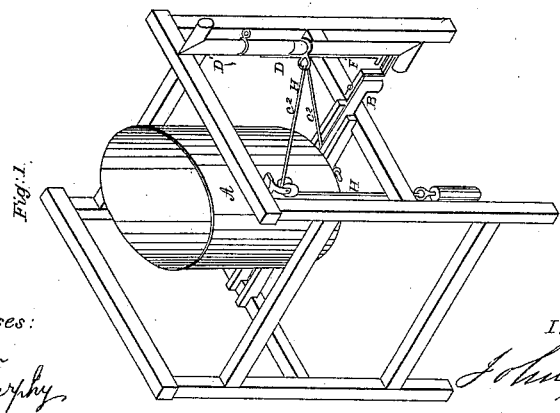
Witnesses:
O. Clausen
L. Murphy
Inventor:
John Morton
by
D. P. Holloway & Co
his Attys

United States Patent Office.

JOHN MORTON, OF WINCHESTER, INDIANA.

Letters Patent No. 63,418, dated April 2, 1867.

IMPROVED WATER TANK FOR RAILROADS.

*The Schedule referred to in these Letters Patent and making part of the same.*

TO ALL WHOM IT MAY CONCERN:

Be it known that I, JOHN MORTON, of the town of Winchester, county of Randolph, and State of Indiana, have invented a new and useful Improvement in Water Tanks for Supplying Locomotives with Water; and I do hereby declare that the following is a full, clear, and exact description of the same, reference being had to the annexed drawings, making part of this specification, in which—

Figure 1 is a perspective view; and

Figure 2 is a vertical section.

I employ the same letters in both figures in the indication of identical parts.

A is the water tank, from which the water is conducted through a pipe, B, opening out of the bottom. This pipe is opened and closed by means of the valve C, the stem of which is adjustably attached to the bell-crank $C^1$, through which the valve may be opened by the cord $C^2$. When the cord is released the valve will be closed by the pressure of the water and the weight G attached to the valve stem. The pipe terminates with a vertical elbow. D is the connecting pipe, suspended from the pipe B by the hinge E, on which the connecting pipe swings vertically. The hinge is attached to the pipe B by a pin, making a swivel joint, so that the pipe D may be moved horizontally to bring it over the hole in the tank. To this end, also, the connecting pipe D is made in two parts, D and D', having a telescopic joint, by which the length of the connecting pipe may be regulated at will. A rod, F, attached to the outer joint, passes through an eye on the inner joint, and is bent at the end to prevent the sliding joint D' being separated from the joint D. Weights are attached to the connecting pipe by cords, H, passing over adjustable pulleys I to counterbalance the weight of the pipe and facilitate its operation. In the ordinary water tanks the connecting pipe is on the line of the pipe opening from the tank, and to accommodate it to the hole in the locomotive tender the whole train has to be moved frequently several times backward and forward before the tender can be stopped in the right place. My improvement consists in so constructing and attaching the connecting pipe that it may be lengthened and shortened and turned forward or back as may be necessary to connect it with the tender.

What I claim as my invention, and desire to secure by Letters Patent, is—

1. In combination with the tank A and stationary pipe B, I claim a horizontally adjustable connecting pipe D, arranged to operate substantially as and for the purpose set forth.

2. The combination of the pipe B, adjustable connecting pipe D, and adjustable hinge E, substantially as set forth.

3. The combination of the horizontally adjustable pipe D, and the ropes and weights H and swivel pulleys I, substantially as and for the purpose set forth.

4. The combination of the cord $C^2$, bell-crank $C^1$, and valve C with its stem and weights G, substantially as set forth.

In testimony whereof I have signed my name to this specification in the presence of two subscribing witnesses.

JOHN MORTON.

Witnesses:
    L. J. MONKS,
    MOORMAN WAY.